(12) United States Patent
Kawabata et al.

(10) Patent No.: US 6,373,533 B1
(45) Date of Patent: Apr. 16, 2002

(54) IMAGE QUALITY CORRECTION CIRCUIT FOR VIDEO SIGNALS

(75) Inventors: Minoru Kawabata; Masahiro Takeshima, both of Takatsuki; Atsuhisa Kageyama, Ibaraki; Hiroko Sugimoto, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/034,851

(22) Filed: Mar. 4, 1998

(30) Foreign Application Priority Data

Mar. 6, 1997 (JP) ............................... 9-051334

(51) Int. Cl.$^7$ ................................. H04N 5/14
(52) U.S. Cl. ................. 348/672; 348/671; 348/624; 382/168
(58) Field of Search .................. 348/671, 672, 348/674, 687, 645, 646; 382/168, 172, 169; 358/522, 521

(56) References Cited

U.S. PATENT DOCUMENTS

| 4,903,145 A | 2/1990 | Funada ...................... 358/462 |
| 5,140,649 A | 8/1992 | Kageyama ................... 382/51 |
| 5,289,282 A | 2/1994 | Tsuji et al. ................. 348/624 |

FOREIGN PATENT DOCUMENTS

| EP | 0 258 740 | 3/1988 |
| EP | 0 516 084 | 12/1992 |
| JP | 5-66751 | 3/1993 |

Primary Examiner—Reinhard J. Eisenzopf
Assistant Examiner—Trang U. Tran
(74) Attorney, Agent, or Firm—Ratner & Prestia

(57) ABSTRACT

The tone of video signals is corrected without degrading the tone of certain image features, such as a human face. A gain controller operates and outputs an adjustment value using a histogram output produced by a histogram generator. An average value of picture levels on a screen is detected by an average picture level detector. A histogram correction circuit calculates a look-up table, and a video signal correction circuit corrects the tone of the video signals using the look-up table.

13 Claims, 4 Drawing Sheets

IMAGE QUALITY CORRECTION CIRCUIT FOR VIDEO SIGNALS

FIELD OF THE INVENTION

The present invention relates to the field of image quality correction circuits for correcting the tone of video images using a histogram of video signals.

BACKGROUND OF THE INVENTION

Larger and wider screens are becoming increasingly common in color television sets, and much research attention is being focused on improvements in picture quality technology to obtain video images with higher picture quality.

A technology for applying a histogram of video signals is disclosed in the Japanese Laid-open Patent No. H5-66751. The disclosed technology emphasizes picture levels, i.e. levels of the luminance signal, occupying a large portion of the video signal. This technology improves the image quality and attempts to produce high-contrast video images.

An example of tone correction circuits using a histogram of the aforementioned patent is explained next with reference to figures.

FIG. 6 shows a block diagram of a tone correction circuit using the histogram of the aforementioned patent. In FIG. 6, a histogram generator 1 creates a histogram b which indicates the distribution of video signal levels of input video signals a. A video signal correction circuit 4 receives the histogram output b from the histogram generator 1, and creates and normalizes a cumulative histogram. The video signal correction circuit 4 further corrects the tone of the input video signals a using the normalized data, and outputs corrected video signals e.

The operation of the tone correction circuit using the histogram of the prior art as configured above is explained next.

In the circuit shown in FIG. 6, the histogram generator 1 creates, for example, a histogram with four intervals. In this case, if an image of a person standing against a dark background as shown in FIG. 8 is the input, then the histogram output from the histogram generator 1 represents frequencies H1, H2, H3, and H4 corresponding to intervals S1, S2, S3, and S4 as shown in FIG. 7. In FIG. 7, the input video signal level S is plotted along the abscissa and the frequency F is plotted along the ordinate.

More specifically, H1 is a frequency of the picture level falling in S1. Similarly, H2 is a frequency of the picture level falling in S2, H3 is a frequency of the picture level falling in S3, and H4 is a frequency of the picture level falling in S4.

The video signal correction circuit 4 cumulates and normalizes the histogram created as above to produce a cumulative and normalization function such as L1 in FIG. 7. The abscissa T shows the level of the cumulative and normalization function having a maximum value of 1. The video signal correction circuit 4 corrects and outputs the picture level of the input video signals using the cumulative and normalization function L1.

In other words L1 in FIG. 7 shows the characteristic of the input picture level versus the output picture level. Tone correction is achieved using a look-up table created from this characteristic. The 'look-up table' hereafter refers to the input/output picture level characteristic represented, for example, by the cumulative and normalization function L1 in FIG. 7. If the slope of the cumulative and normalization function L1 is steep, the ratio of the output picture level to the input picture level increases, which means that the tone is intensified.

For example, consider the case where video signals are concentrated in picture level S1, and therefore the frequency H1 becomes large. If after cumulation and normalization a look-up table is produced for correction, then the slope of cumulative and normalization function L1 corresponding to the interval S1 becomes steep. Thus, the contrast of the picture level in the interval S1, where the video signals are concentrated is increased. Accordingly, the tone correction circuit using a histogram of the aforementioned patent executes tone correction without modifying the original histogram.

With the above circuit configuration, however, parts of the image important to a user may be reproduced at a lower than optimal tone. This problem can arise in parts of the image a user wishes to pay particular attention to, such as human faces, because this part of the image only occupies a small area which is attenuated by histogram analysis.

SUMMARY OF THE INVENTION

A tone correction circuit of the present invention corrects the tone of video signals by using a histogram. The histogram is in turn corrected again by a controller which is adjustable. The controller is adjusted as required for intensifying the input/output video signal characteristic of the picture level in certain areas of importance to the user. Thus, the tone of video signals is corrected using corrected histograms.

Accordingly, the present invention offers a tone correction circuit for video signals that corrects the tone by intensifying the contrast of an area which the user may want to pay particular attention to such as human faces.

DESCRIPTION OF THE PREFERRED EMBODIMENTS

First Exemplary Embodiment

Figure 1:
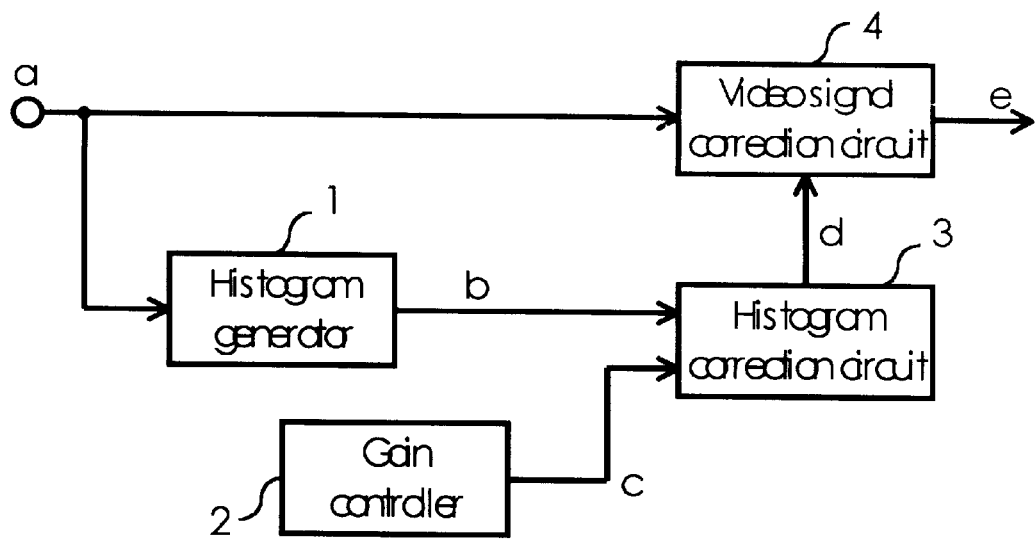
FIG. 1 shows a block diagram of a tone correction circuit for video signals in accordance with a first exemplary embodiment of the present invention.

FIG. 1 shows a tone correction circuit for video signals in a first exemplary embodiment of the present invention comprising a histogram generator 1, gain controller 2, histogram correction circuit (histogram controller) 3, and video signal correction circuit 4. The histogram generator 1 generates the distribution of picture levels, i.e. levels of the luminance signal, of input video signals a in the form of a histogram, and outputs a histogram b. The gain controller 2 outputs an adjustment value c for correcting the histogram. The histogram correction circuit (histogram controller) 3 receives the histogram b and the adjustment value c, and outputs a corrected histogram d for intensifying the frequency of a portion of the image containing the picture level required to display a certain feature contained in the image (e.g. a human face). The video signal correction circuit 4 corrects the tone of the input video signals a using the corrected histogram d to produce output video signals e.

The operation of the tone correction circuit for video signals as configured above is explained next with reference to the drawings.

Figure 8:
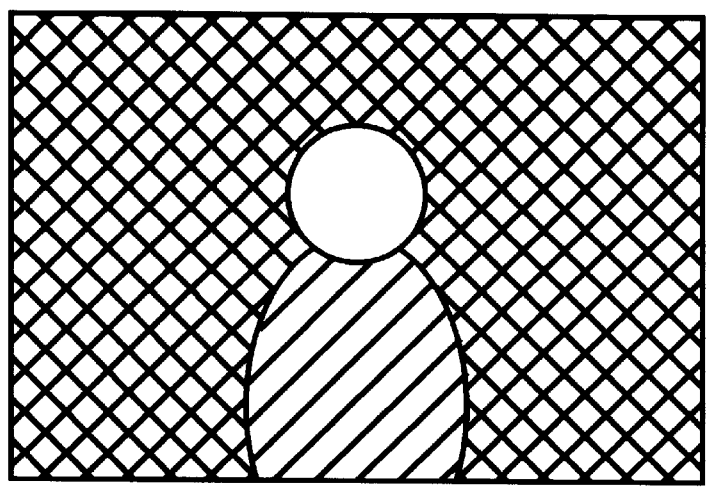
FIG. 8 shows an example of input video images.

First, given an image such as in FIG. 8 (people standing against a dark background) is input to a tone correction circuit as in FIG. 1, the histogram generator 1 creates a histogram b from the input video signals a.

Figure 7:
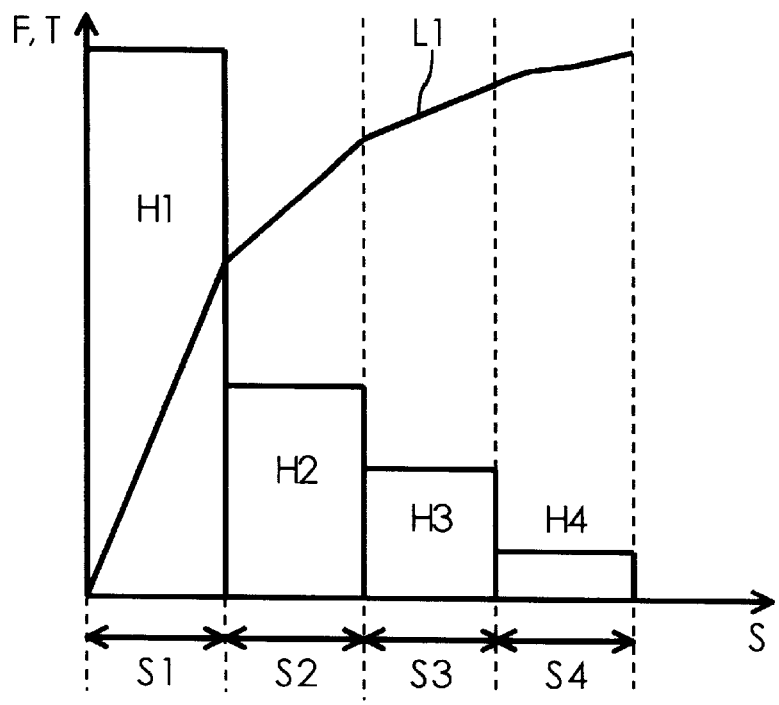
FIG. 7 shows a revised histogram and a lookup table created therefrom by the tone correction circuit using histogram of the prior art.

Here, the interval containing the picture level for displaying a human face, for example, in the image corresponds to an interval S3 in FIG. 7. The region S3 is, for example, a region where picture level varies from 50% to 75%, where the picture level of the input video signal is 100% at maximum and 0% at minimum. The area of the face on a screen is relatively small, and therefore the frequency of the interval S3 is often small compared with the frequencies of intervals S1 and S2 where picture level is lower than in S3 as in FIG. 7. This forms a moderate slope in the lookup table or the cumulative and normalization function for this interval, resulting in a reduction of the contrast of the face.

In the present invention, a certain value is added to the frequency H3 of the interval S3 containing the picture level for displaying the face in the histogram, and then an adjustment value c is subtracted from the frequency of the other intervals. The video signal correction circuit 4 uses this corrected histogram for correcting the input video signals. Accordingly, the frequency H3 of the area S3 containing the picture level for displaying the face is intensified to improve the contrast of this portion.

Figure 3:
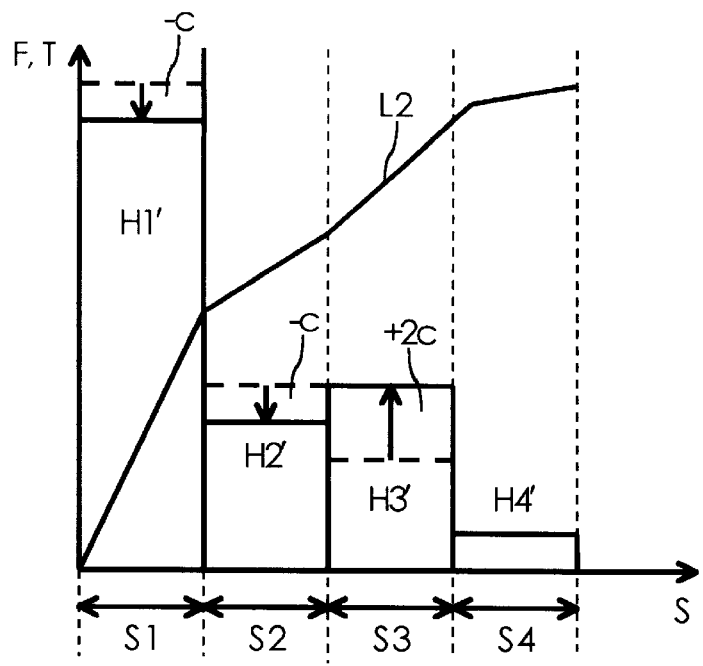
FIG. 3 shows a revised histogram and a lookup table created therefrom by the tone correction circuit for video signals in accordance with the first exemplary embodiment of the present invention.
Figure 6:
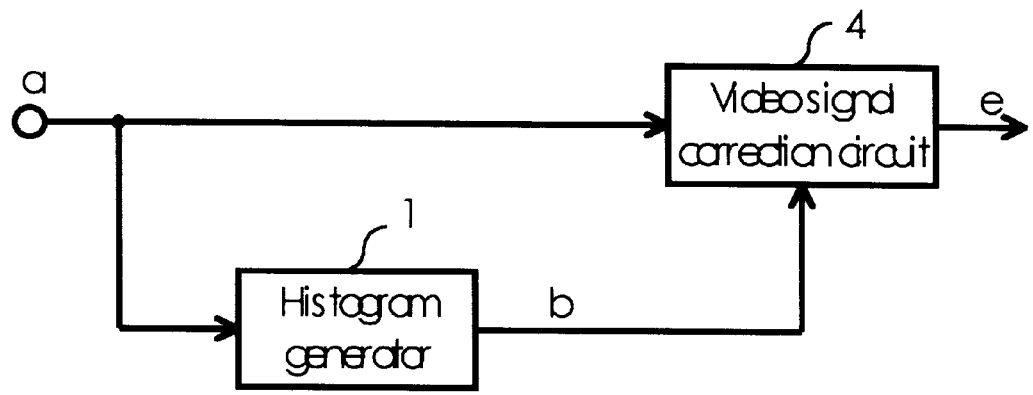
FIG. 6 shows a block diagram of a tone correction circuit using histogram of the prior art.

The solid line in FIG. 3 shows an updated histogram graph F based on corrected histogram d created by the histogram correction circuit (histogram controller) 3 and a cumulative and normalization function L2. The frequency indicated with a dotted line is a histogram output from the histogram generator 1 in FIG. 1, which is the same histogram as the output of the histogram generator 1 of the conventional circuit shown in FIG. 6.

The histogram correction circuit (histogram controller) 3 in FIG. 1 adjusts the frequency level in each interval of the histogram b, and outputs the corrected histogram d. In the histogram, the frequency of the interval containing the picture level corresponding to the face is intensified.

The frequency H1 of the interval S1 corresponding to the lowest picture level (darkest) in FIG. 7, for example, is decreased by the adjustment value c to H1' in FIG. 3.

The adjustment value c is also subtracted from the frequency H2 of the interval S2 to arrive at the new frequency level H2'. The sum of the adjustments to the frequencies H1 and H2, namely, 2c, is added to the frequency H3 of the interval S3 to arrive at the new frequency H3' for the interval S3. With this adjustment, the frequency H3 of the interval S3, where the picture level for displaying the face is concentrated, is intensified, and the histogram correction circuit 3 (histogram controller) outputs the corrected histogram d to the video signal correction circuit 4.

The cumulative and normalization function obtained using the corrected histogram d is shown as a line L2 in FIG. 3. Compared with the cumulative and normalization function L1 (the lookup table representing the cumulative and normalization function shown as L1) in FIG. 7, the cumulative and normalization function L2 in FIG. 3 (the lookup table) has a steeper slope for the interval of S3; where picture levels for the face are concentrated. Hence, the tone of the face in the image is improved.

As explained above, this exemplary embodiment enables correction of the signal tone without degrading the tone of certain features in an image, such as human faces, by correcting the histogram b using an adjustment value c supplied by the gain controller 2.

Second Exemplary Embodiment

Figure 2:
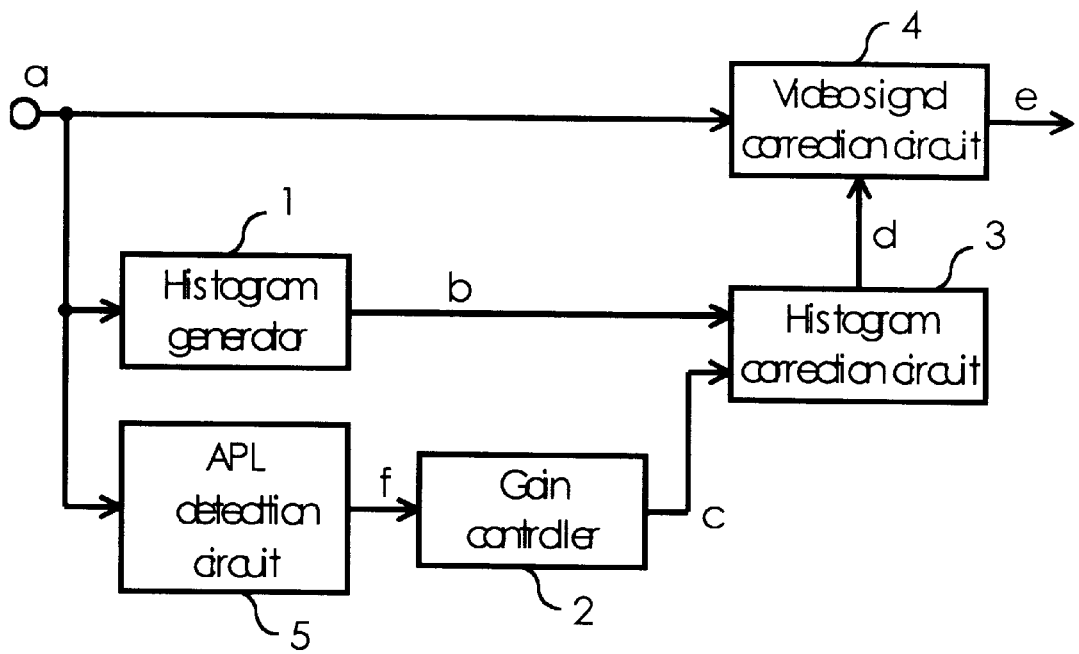
FIG. 2 shows a block diagram of a tone correction circuit for video signals in accordance with a second exemplary embodiment of the present invention.

FIG. 2 shows a tone correction circuit for video signals in a second exemplary embodiment of the present invention. A difference with the first exemplary embodiment is that an average picture level detection circuit 5 (APL detection circuit) is added to the configuration of the first exemplary embodiment. The average picture level detector 5 detects the average value of the picture levels of the input video signals a, and outputs the average picture level f to the gain controller 2. The other components in FIG. 2 are configured in much the same way as in the first exemplary embodiment, and thus the explanation of their functionality is omitted here.

The operation of the tone correction circuit for video signals as configured above is explained next with reference to the drawings.

In the configuration of the first exemplary embodiment, the tone of the face may be excessively intensified if the aforementioned correction is performed under conditions where the level of the frequency H3 in FIG. 7 is high. For example, in an image where the entire input video image is bright and the average picture level is high. The second exemplary embodiment detects the average picture level from the input video signals a using the average picture level detector 5 to output the average picture level f. The gain controller 2 receives this average picture level f, and outputs the adjustment value c based on the value of f.

Figure 5:
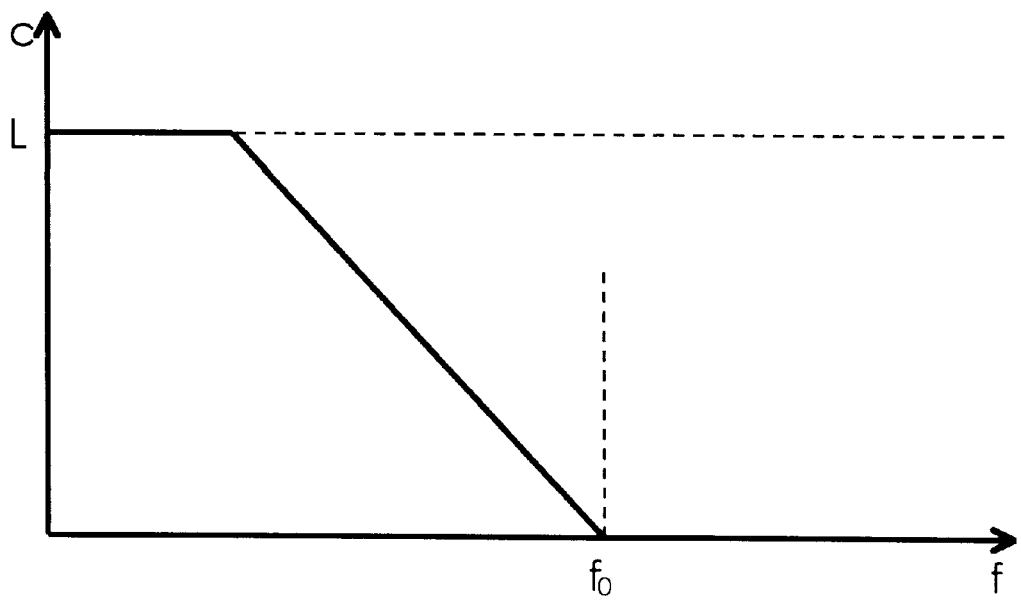
FIG. 5 shows a relationship between characteristics of average picture level and gain for histogram correction.

FIG. 5 shows a possible dependency of the adjustment value c on the average picture level f. The average picture level f is plotted along the abscissa and the adjustment value c is plotted along the ordinate. The adjustment value c falls to zero (0) when the average picture level f is high, i.e. the tone is not corrected. The adjustment value c is non-zero when the average picture level f is below a correction starting level $f_0$. The adjustment value c increases as the average picture level f decreases, but, to prevent excessive correction, it is set so as not to exceed a limit level L as in FIG. 5. The correction starting level $f_0$, and the limit level L, as well as the increase ratio of the adjustment value c to the average picture level f (the slope of the line in FIG. 5) can be freely set.

As explained above, this exemplary embodiment enables the correction of the tone in response to the brightness of an image. Correction is performed without degrading the tone of features, such as human faces. Corrections are displayed by modifying the histogram created using the adjustment value calculated from the average picture level by the gain controller 2.

Third Exemplary Embodiment

The third exemplary embodiment has the same configuration as the one shown in FIG. 2. Thus, the same effect as that of the second exemplary embodiment is achievable. In particular, the tone of a signal may be corrected without degrading the tone of features such as human faces. However, the slope of the cumulative and normalization function for an interval S1 becomes shallower when the frequency H1' is computed by subtracting the adjustment value c from the frequency H1 in FIG. 3. This results in insufficient intensification of the tone of those areas where most of the video signals are concentrated in some input video images.

Figure 4:
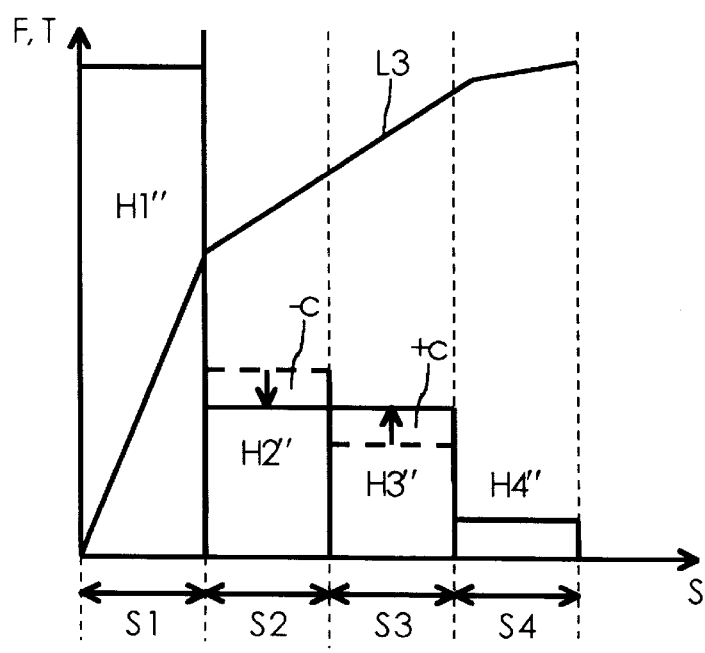
FIG. 4 shows a revised histogram and a lookup table created therefrom by the tone correction circuit for video signals in accordance with the third exemplary embodiment of the present invention.

To overcome this, the third exemplary embodiment is configured to subtract the adjustment value c from the frequency H2 to arrive at the new frequency H2", the same amount (adjustment value c) is added to the frequency H3, but no modification is made to the frequency H1 as shown by a solid line in FIG. 4. With this configuration, the tone of the interval S3 corresponding to such features as human faces may be improved while simultaneously securing sufficient tone in parts of the image where the picture levels are most concentrated.

INDUSTRIAL APPLICABILITY

The present invention offers a tone correction circuit for video signals that allows for tone correction by intensification of the tone of the picture level corresponding to portions of the image a user may want to pay particular attention to, such as human faces. The tone correction circuit of the present invention improves the contrast of display devices including color television sets.

In the above explanation, picture levels of video signals serve as both inputs and outputs. The same effect is achievable when a composite video signal alternatively serves as input and output.

The exemplary embodiments refer to cases where four levels are created in the histogram generator. It is also apparent that the same effect is achievable for more than four levels in the histogram.

What is claimed is:

1. A correction circuit comprising:
   histogram generation means for generating a first histogram from an input video signal;
   gain control means for outputting a first adjustment value for correcting said first histogram;
   histogram correction means for creating a corrected second histogram by altering each frequency in said first histogram based on said first adjustment value so that a sum of said frequencies in said first histogram is constant; and
   video signal correction means for receiving said corrected second histogram from said histogram correction means and for correcting the input video signal based on said corrected second histogram.

2. A tone correction circuit as defined in claim 1, further comprising
   average picture level detection means for detecting an average picture level of said input video signal and outputting said average picture level to said gain control means; and
   wherein said gain control means alters said first adjustment value based on said average picture level.

3. A tone correction circuit as defined in claim 1, wherein said video signal correction means produces a cumulative and normalization function based on said corrected second histogram created by said histogram correction means, and alters the input video signal based on said cumulative and normalization function.

4. A tone correction circuit as defined in claim 1, wherein said first adjustment value is a constant value.

5. A tone correction circuit comprising:
   histogram generation means for generating a first histogram from an input video signal;
   gain control means for outputting a first adjustment value for correcting said first histogram;
   histogram correction means for creating a corrected second histogram by altering each frequency in said first histogram based on said first adjustment value, so that a sum of said frequencies in said first histogram is constant;
   video signal correction means for receiving said corrected second histogram from said histogram correction means and for correcting the input video signal based on said corrected second histogram; and
   average picture level detection means for detecting an average picture level of said input video signal;
   wherein said average picture level detection means outputs a second adjustment value if said average picture level is greater than a correction starting level, and outputs a third adjustment value if said average picture level is smaller than said correction starting level, and said gain control means alters said first adjustment value based on the output of said average picture level detection means.

6. A tone correction circuit comprising:
   histogram generation means for generating a first histogram from an input video signal;
   gain control means for outputting a first adjustment value for correcting said first histogram;
   histogram correction means for creating a corrected second histogram by altering each frequency in said first histogram based on said first adjustment value so that a sum of said frequencies in said first histogram is constant;
   video signal correction means for receiving said corrected second histogram from said histogram correction means and for correcting the input video signal based on said corrected second histogram, and average picture level detection means for detecting an average picture level of said input video signal;
   wherein said video signal correction means produces a cumulative and normalization function based on said corrected second histogram created by said histogram correction means, and alters the input video signal based on said cumulative normalization function.

7. A tone correction circuit comprising:
   histogram generation means for generating a first histogram from an input video signal;
   gain control means for outputting a first adjustment value for correcting said first histogram;
   histogram correction means for creating a corrected second histogram by altering each frequency in said first histogram based on said first adjustment value so that a sum of said frequencies in said first histogram is constant;
   video signal correction means for receiving said corrected second histogram from said histogram correction means and for correcting the input video signal based on said corrected second histogram, and
   average picture level detection means for detecting an average picture level of said input video signal;
   wherein said average picture level detection means outputs a second adjustment value if said average picture level is greater than a correction starting level, and outputs a third adjustment value if said average picture level is smaller than said correction starting level, and said gain control means alters said first adjustment value based on the output of said average picture level detection means, and said first adjustment value is restricted by a limit level.

8. A tone correction circuit comprising:

histogram generation means for generating a first histogram from an input video signal;

gain control means for outputting a first adjustment value for correcting said first histogram;

histogram correction means for creating a corrected second histogram by altering each frequency in said first histogram based on said first adjustment value so that a sum of said frequencies in said first histogram is constant;

video signal correction means for receiving said corrected second histogram from said histogram correction means and for correcting the input video signal based on said corrected second histogram, and average picture level detection means for detecting an average picture level of said input video signal;

wherein said video signal correction means produces a cumulative and normalization function based on said corrected second histogram created by said histogram correction means, and alters the input video signal based on said cumulative and normalization function, and said first adjustment value is restricted by a limit level.

9. A tone correction circuit comprising:

histogram generation means for generating a first histogram from an input video signal;

histogram correction means for creating a corrected second histogram by altering each frequency in said first histogram based on said first adjustment value;

video signal correction means for receiving said corrected second histogram from said histogram correction means and for correcting the input video signal based on said corrected second histogram;

average picture level detection means for detecting an average picture level of said input video signal; and gain control means for outputting a first adjustment value for correcting said first histogram based on an output from said average picture level detection means.

10. A tone correction circuit as defined in claim 9, wherein said average picture level detection means outputs a second adjustment value if said average picture level is greater than a correction starting level, and outputs a third adjustment value if said average picture level is smaller than said correction starting level, and said gain control means alters said first adjustment value based on the output of said average picture level detection means.

11. A tone correction circuit as defined in claim 9, wherein said gain control means alters said first adjustment value based on said average picture level.

12. A tone correction circuit as defined in claim 9, wherein said video signal correction means produces a cumulative normalization function based on said corrected second histogram created by said histogram correction means, and alters the input video signal based on said cumulative and normalization function.

13. A tone correction circuit as defined in claim 9, wherein said first adjustment value is restricted by a limit level.

* * * * *

UNITED STATES PATENT AND TRADEMARK OFFICE
CERTIFICATE OF CORRECTION

PATENT NO.   : 6,373,533 B1
DATED        : April 16, 2002
INVENTOR(S)  : Minoru Kawabata et al.

It is certified that error appears in the above-identified patent and that said Letters Patent is hereby corrected as shown below:

<u>Title page,</u>
Item [56], References Cited, U.S. PATENT DOCUMENTS, please insert the following:

| -- | 5,544,258 | 8/1996 | Levien | |
|----|-----------|--------|--------|----|
|    | 4,928,167 | 5/1990 | Tatsumi et al. | |
|    | 4,731,671 | 3/1988 | Alkofer | |
|    | 4,899,216 | 2/1990 | Tatsumi et al. | |
|    | 5,426,517 | 6/1995 | Schwartz | |
|    | 5,617,223 | 8/1996 | Burns et al. | -- |

Signed and Sealed this

Third Day of December, 2002

JAMES E. ROGAN
*Director of the United States Patent and Trademark Office*